(12) United States Patent  (10) Patent No.: US 8,015,675 B2
Andreoli                    (45) Date of Patent:    Sep. 13, 2011

(54) CLAMP FOR SUPPORTING BAR OF COMPONENTS OF CONVEYORS OF ARTICLES

(75) Inventor: Andrea Andreoli, Modena (IT)

(73) Assignee: Rexnord Marbett S.r.l., Correggio (Reggio Emilia) (IT)

( * ) Notice: Subject to any disclaimer, the term of this patent is extended or adjusted under 35 U.S.C. 154(b) by 844 days.

(21) Appl. No.: 11/971,517

(22) Filed: Jan. 9, 2008

(65) Prior Publication Data

US 2008/0168632 A1    Jul. 17, 2008

(30) Foreign Application Priority Data

Jan. 11, 2007 (IT) ............................. MI2007A0031

(51) Int. Cl.
     *B65G 21/20* (2006.01)
(52) U.S. Cl. .................... 24/457; 198/836.3; 403/109.3; 403/196; 403/287; 403/400
(58) Field of Classification Search ............... 198/836.3, 198/836.1, 836.2; 24/457; 403/109.3, 196, 403/235, 234, 287, 326, 329, 373, 396, 398, 403/400; 248/354.4, 231.85
   See application file for complete search history.

(56) References Cited

U.S. PATENT DOCUMENTS

| 3,647,051 A * | 3/1972 | Didas ......................... 198/836.3 |
| 5,682,976 A | 11/1997 | Jorgensen |
| 5,860,511 A * | 1/1999 | Ensch et al. ............... 198/836.3 |
| 5,967,295 A * | 10/1999 | Ledingham ............... 198/836.3 |
| 6,260,245 B1 | 7/2001 | Marsetti |
| 6,634,826 B1 | 10/2003 | Marsetti |

FOREIGN PATENT DOCUMENTS

| CA | 2211915 A1 | 2/1998 |
| EP | 0953523 A | 11/1999 |
| EP | 1061015 A | 12/2000 |
| EP | 1840050 A | 10/2007 |
| JP | 09323808 A | 12/1997 |
| WO | 98/18697 A | 5/1998 |

OTHER PUBLICATIONS

European Search Report dated Apr. 9, 2008.

\* cited by examiner

*Primary Examiner* — James Brittain
(74) *Attorney, Agent, or Firm* — Quarles & Brady LLP

(57) ABSTRACT

A clamp adapted to clamp a bar, particularly supporting components such as guides of conveyors of articles. The clamp includes: a clamp body, adapted to accommodate the support bar for supporting the components, with the possibility of adjusting the relative position of the bar with respect to the clamp by longitudinally sliding the bar; positioning means arranged to have a first working position in which the positioning means are elastically urged in abutment against the bar to engage at least positioning notch, provided on the bar, upon reaching a predetermined position, so as to essentially prevent a further longitudinal sliding of the bar once said predetermined position is reached. The clamp further includes tightening means, distinct from said positioning means and adapted in use to hold the bar in position against displacements with respect to the clamp body.

26 Claims, 6 Drawing Sheets

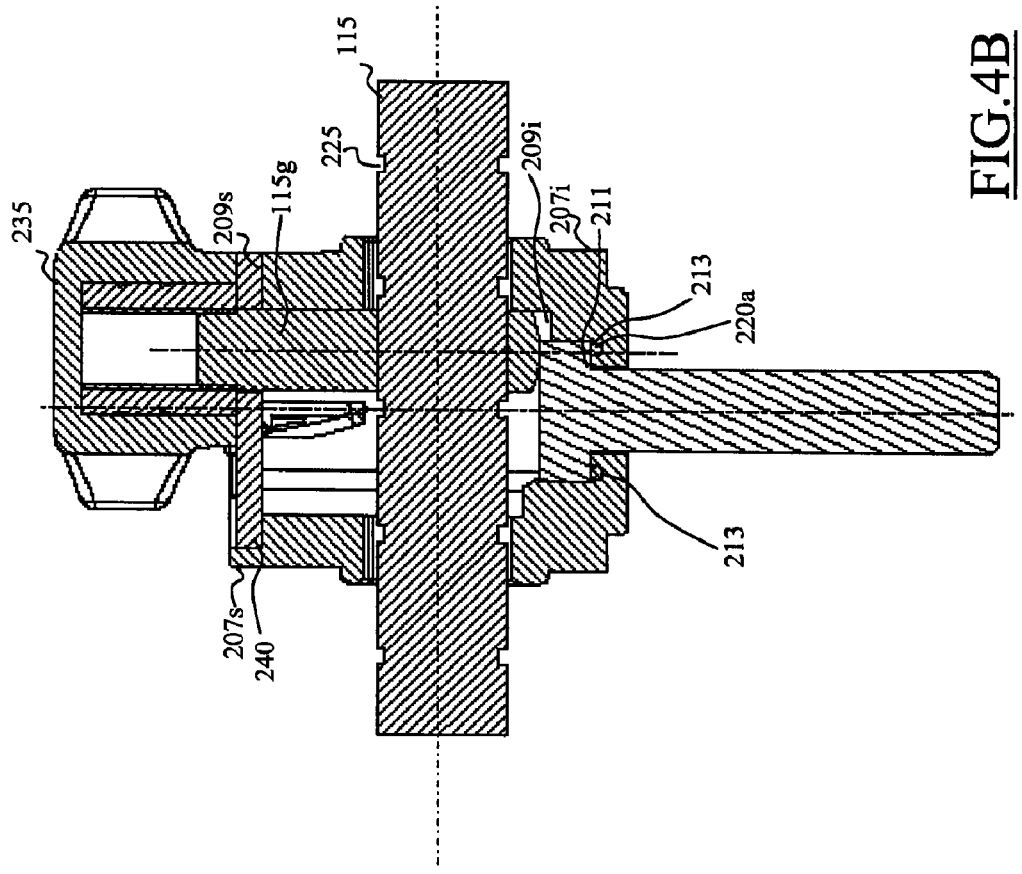
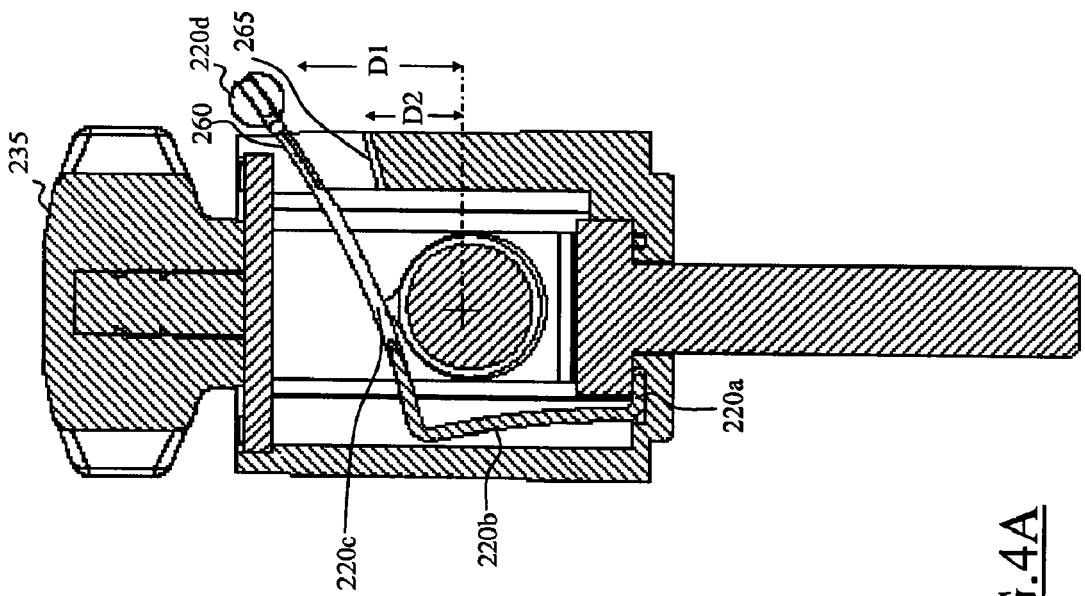
FIG.4B
FIG.4A

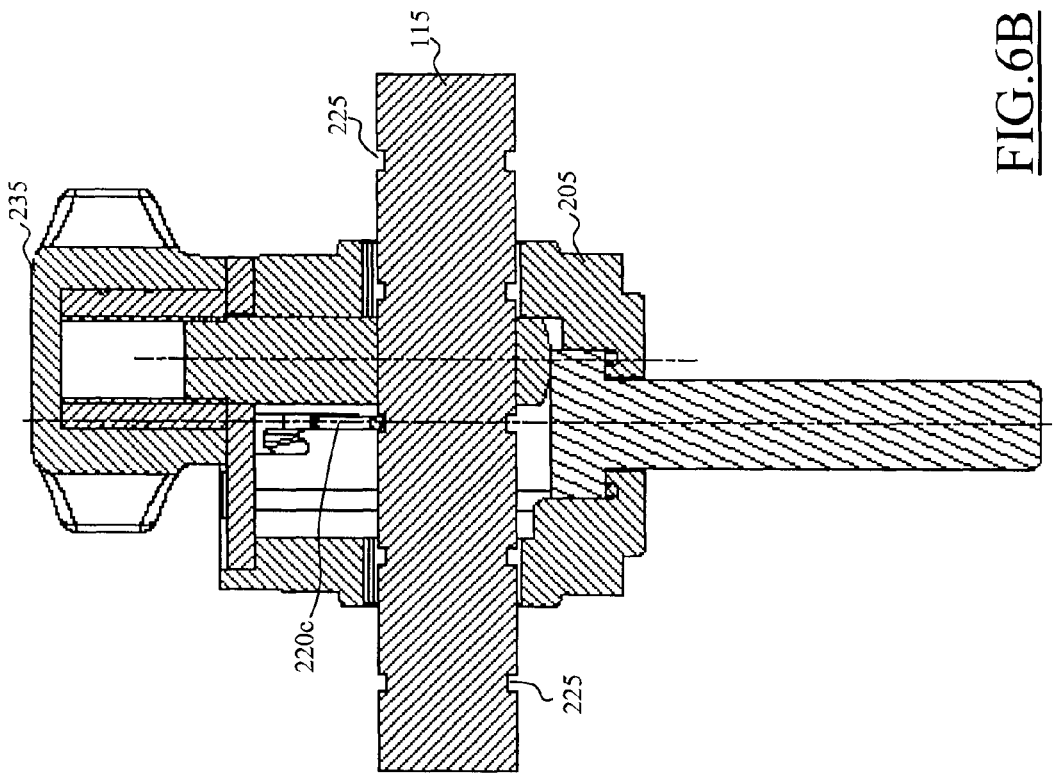
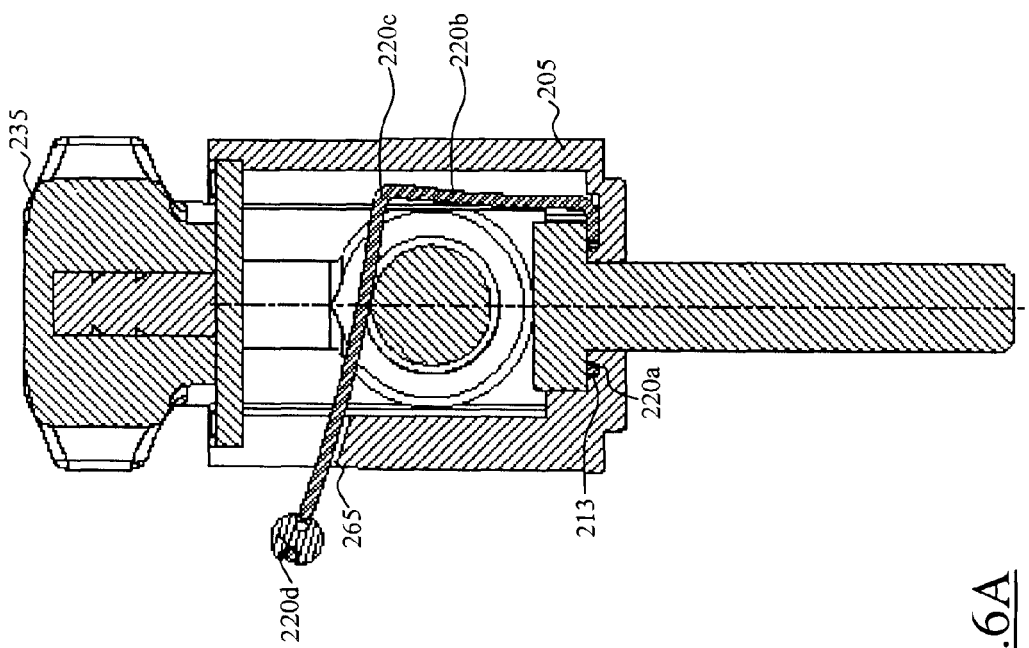
FIG.6B
FIG.6A

CLAMP FOR SUPPORTING BAR OF COMPONENTS OF CONVEYORS OF ARTICLES

CROSS REFERENCES TO RELATED APPLICATIONS

This application claims the priority benefit of Italian patent application, IT MI2007A000031, filed on Jan. 11, 2007.

STATEMENT REGARDING FEDERALLY SPONSORED RESEARCH

Not Applicable

TECHNICAL FIELD

The present invention relates to a clamp of the type employed in conveyors of articles for supporting the components thereof.

DESCRIPTION OF THE BACKGROUND ART

Clamps of the above mentioned type are used in conveyors of articles, for instance in belt or chain conveyors, for supporting components thereof, such as guides for the containment/routing of the transported articles.

In such applications, the clamps normally sustain a respective bar (for example a steel rod) intended in turn to support guide-holding elements of the guide for the containment/routing of the articles. The bar has, mounted on one end thereof (also referred to as the head), a guide-holding element, and the bar is clamped by the clamp, with the possibility of adjusting the bar position, the clamp being in turn fixed to the frame of the conveyor.

The conveyors of articles are often used for transporting articles of various shape and size, so that it is necessary to be able to adjust the position of the containment/routing guides, depending on the type of articles to be transported (for instance, plastic bottles for drinks of various size).

A known clamp of the above-mentioned type is shown for instance in the Italian utility model application No. MI99U000397. Such a clamp includes an external body for the operations of positioning and adjusting of the protruding bar section ("pivot"), on which the guide-holding element is mounted. Such external body consists of a hollow cylindrical body having a coaxial pair of through holes (adapted in use to be traversed by the bar) formed in its side wall and close to an upper end thereof, and has an inner diameter that reduces in proximity of a step. A movable member, movable inside the hollow cylindrical body along the longitudinal axis thereof, is urged by a helical spring interposed between the step and the movable body. A handle grip is snap-mounted on an upper appendix of the movable member so as to be rotatable relative to the movable body without substantially moving axially with respect thereto. Particularly, the handle grip has a pair of blades ("plug pins") that, in use, are respectively accommodated in a pair of shaped guide openings formed in the upper part of the external body. In this way, when the handle grip is manually rotated by a user in the sense in which the plug pins are moved downwards into the openings, the movable member is pushed downward, against the action of the spring, until a through hole formed therein aligns with the pair of holes of the hollow cylindrical body, so as to allow the passage of the bar. Once the bar is inserted into the holes, by unscrewing the handle grip (and therefore bringing the plugs upward in the openings) the spring pushes the movable member upwards; an annular projection provided in the hole of the movable member can in this way engage one of the grooves provided in different longitudinal positions along the bar, selected in such a way that the guide-holding element mounted on the head of the bar takes the desired position along the belt conveyor. It is by means of such annular projection that the pushing action of the spring causes the clamping of the bar, necessary to keep the guides in the desired position.

The inventor has observed that such a clamp exhibits some drawbacks. In fact, a drawback of such solution is given by the fact that such a clamp is by its nature unsuitable to guarantee a suitable clamping of the bar, adapted to recover the inevitable plays existing between bar and the through holes in the clamp body, and therefore it does not assure that the articles containment/routing guides are kept in the desired position, as parallel as possible to the transport plane. In fact, the action exerted by the spring is not sufficient to prevent that the existing play between the bar and the edges of the through holes causes a displacement of the bar from the horizontal position. The bar, under its own weight and the weight of the guides mounted thereon, can in this way take an inclination (which is higher the longer the bar) that as a result causes an uncorrected alignment of the containment/routing guides. Such phenomenon is more penalizing in the case of conveyors that have several orders of superimposed, parallel guides: in this case, the inclination of the bars that support the guides can has the consequence that the distance between the axes of the upper guides is reduced, while that between the lower guides increases.

With the purpose of guaranteeing a tight clamping of the bar, it would be necessary to realize the spring in a material having very high elastic constant, so that the pushing action exerted by the spring on the movable body is very high. However, this would reduce the efficacy of the clamp under the viewpoint of the bar positioning easiness: a spring that exerts an excessive pushing action against the movable body would make it very difficult, not to say impossible, to longitudinally slide the bar so as to bring one of the grooves formed thereon in correspondence of the annular projection. In fact, in the mentioned clamp the longitudinal positioning of the bar relative to the axis of the hollow cylindrical body takes place simultaneously to the bar clamping, and always with the aid of the spring. In order to allow the sliding of the bar necessary to the positioning thereof, the action exerted by the spring necessarily has to be limited, and this jeopardizes the performances of the clamp in terms of bar clamping action. Thus, even if the force exerted by the spring is increased, this can never guarantee a stable blocking of the bar.

Moreover, the use of the mentioned clamp significantly impacts on the time necessary for the adjustment of the position of the containment/routing guides. In fact, when it is necessary to modify the position of the guides, for every clamp (in a typical transport line their number can be of several tens) the operator in charge of the conveyor set-up has to screw the handle grip up in order to release the bar, then slightly move the bar from its current position, subsequently unscrew the handle grip, checking that the guide-holding element mounted on the bar is brought into the desired position.

In view of the state of the art outlined above, the inventor has faced the problem of providing an improved clamp, that is not, or at least less affected by the above mentioned problems.

SUMMARY OF THE INVENTION

An embodiment of the present invention proposes a solution includes providing elastic means used for the easy and precise positioning of the bar, and distinct tightening means for blocking the bar in the desired position, once the latter has been reached, an event that is made evident thanks to the elastic positioning means.

One embodiment of the invention includes a clamp for clamping a support bar of a conveyor, comprising a clamp body for slidingly accommodating the support bar and positioning means for holding the support bar in a predetermined position with respect to the clamp body, further comprising distinct tightening means for blocking the support bar in the predetermined position. The tightening means are separate from the positioning means. The positioning means are elastic positioning means to elastically engage the support bar. The positioning means are arranged to cooperate with positioning notches on the support bar.

Particularly, an aspect of the embodiment proposes a clamp adapted to block a bar, particularly for the support of components of conveyors of articles. The clamp includes a clamp body adapted to accommodate said bar with possibility of adjustment of the bar position relative to the clamp by means of the longitudinal sliding of the bar. Positioning means are provided, arranged in such a way as to have a first working position in which they are elastically urged in abutment against the bar to engage at least one positioning notch provided on the bar upon reaching the desired position; advantageously, the positioning means are adapted to hold the bar in said predetermined position, substantially preventing a further longitudinal sliding of the bar once said predetermined position has been reached. Clamping means are further provided, distinct from said positioning means and adapted in use to firmly block the bar with respect to the clamp body.

The features characterizing the present invention are set out in the appended claims. The invention, as well as further features and the advantages thereof, will be better understood with reference to the following detailed description, provided purely by way of non-limitative example, to be read in connection with the attached drawings.

BRIEF DESCRIPTION OF THE DRAWINGS

FIGS. 4A and 4B are sectional views along the planes IVA-IVA and, respectively, IVB-IVB of the clamp of FIG. 3, according to an embodiment of the present invention;

FIGS. 6A and 6B are sectional views along the planes VIA-VIA and, respectively, VIB-VIB of the clamp of FIG. 5.

DETAILED DESCRIPTION OF THE PREFERRED EMBODIMENTS

Figure 1:
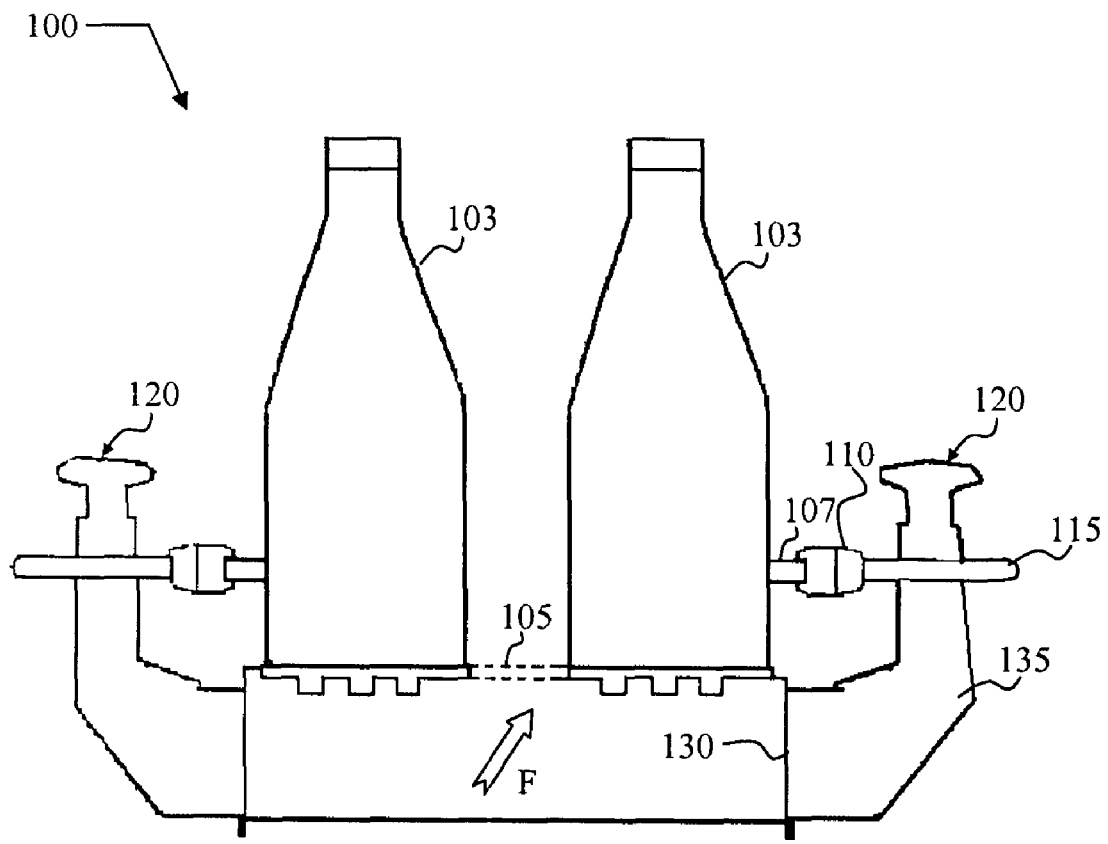
FIG. 1 is an elevation view of a conveyor of articles in which a clamp according to an embodiment of the present invention is used.

With reference to the drawings, in FIG. 1 there is schematically shown in elevation a conveyor of articles 100, for instance but not limitatively for the transport of bottled drinks in plastic bottles 103, in which a clamp according to an embodiment of the present invention is advantageously exploitable. The conveyor 100 includes a transport mat 105, for example a transport belt or a transport chain, made for instance by a succession of chain links hinged to each other so as to define a substantially plane support surface for supporting the transported articles; the transport mat 105 extends along a transport path, and is movable, in the direction of the arrow F, under the action of suitable drive means (not shown in the drawing because known per-se).

For the containment and the correct routing of the articles transported by the transport mat 105, at the two sides thereof guides 107 are provided that extend along the transport path. The guides 107, that can be static, made for instance of bars or profiled elements in steel or plastics (as schematically shown in the drawing), or free-roller guides, are supported by lateral guide-holding elements 110. The guide-holding elements 110, that are placed at the two sides of the transport mat 105, are mounted onto respective bars 115, for example formed of steel rods, that extend substantially horizontally and are in turn attached, through clamps 120, to a part of the frame 130 of the conveyor 100 (through a support 135).

It is underlined that the one shown in FIG. 1 is only one of the various possible uses of a clamp according to the present invention; for example, remaining within the field of conveyors, such clamps can be used for joining together bars intended to support sensors of different nature, like for instance photo detectors for detecting the transit of the transported articles.

Figure 2:
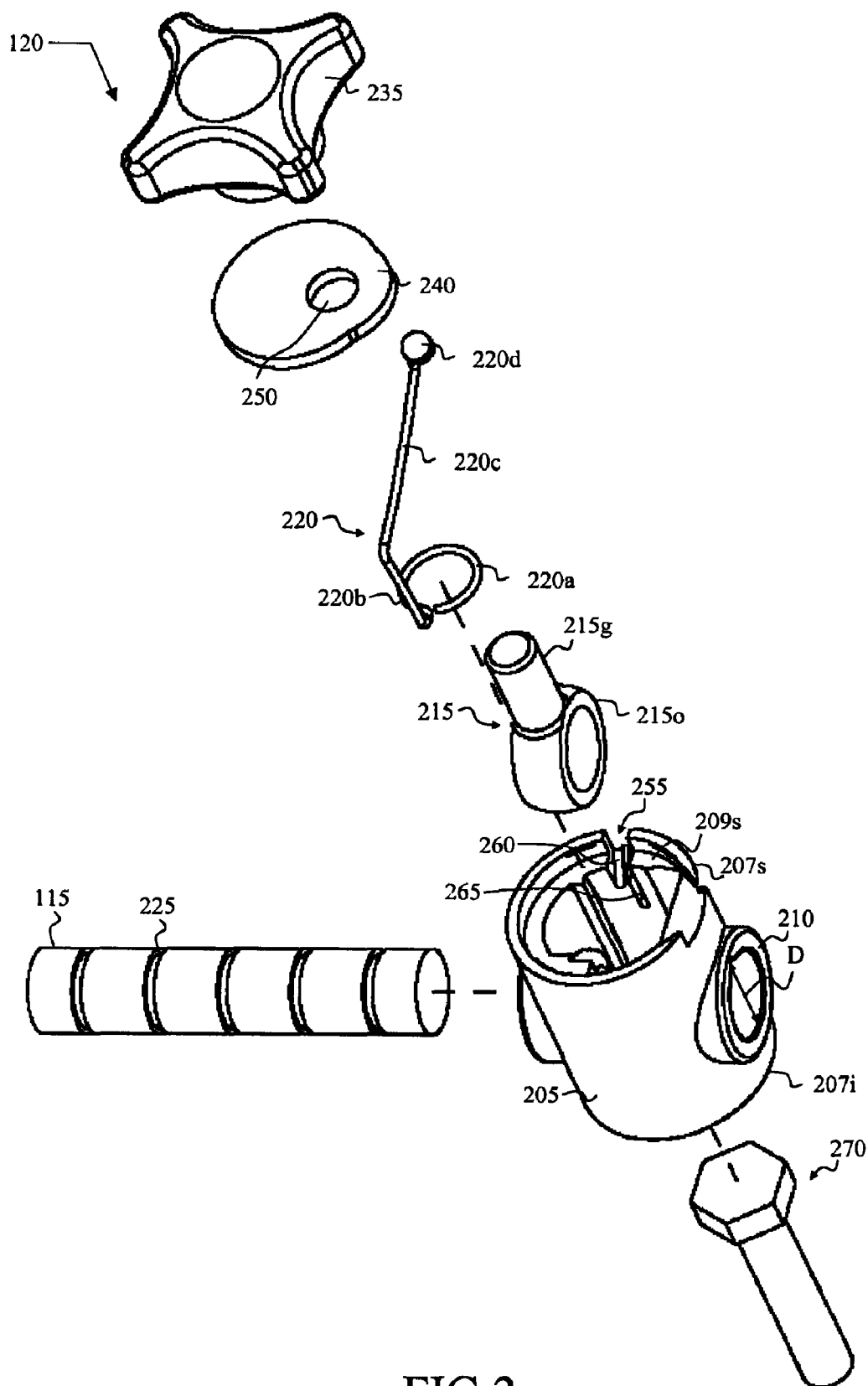
FIG. 2 is an axonometric exploded view of a clamp according to an embodiment of the present invention.
Figure 3:
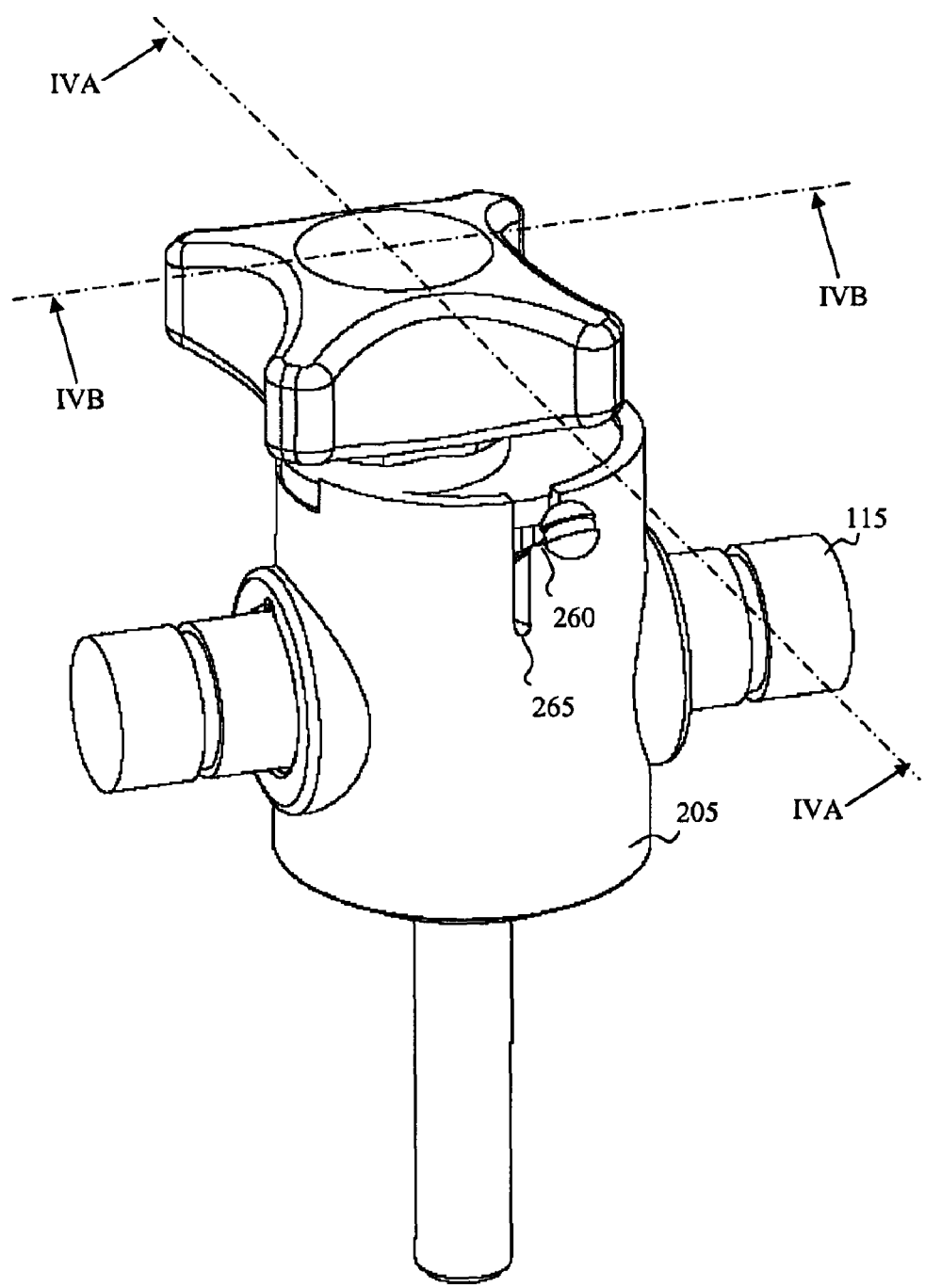
FIG. 3 is an axonometric view of the clamp of FIG. 2, in a first working condition.
Figure 5:
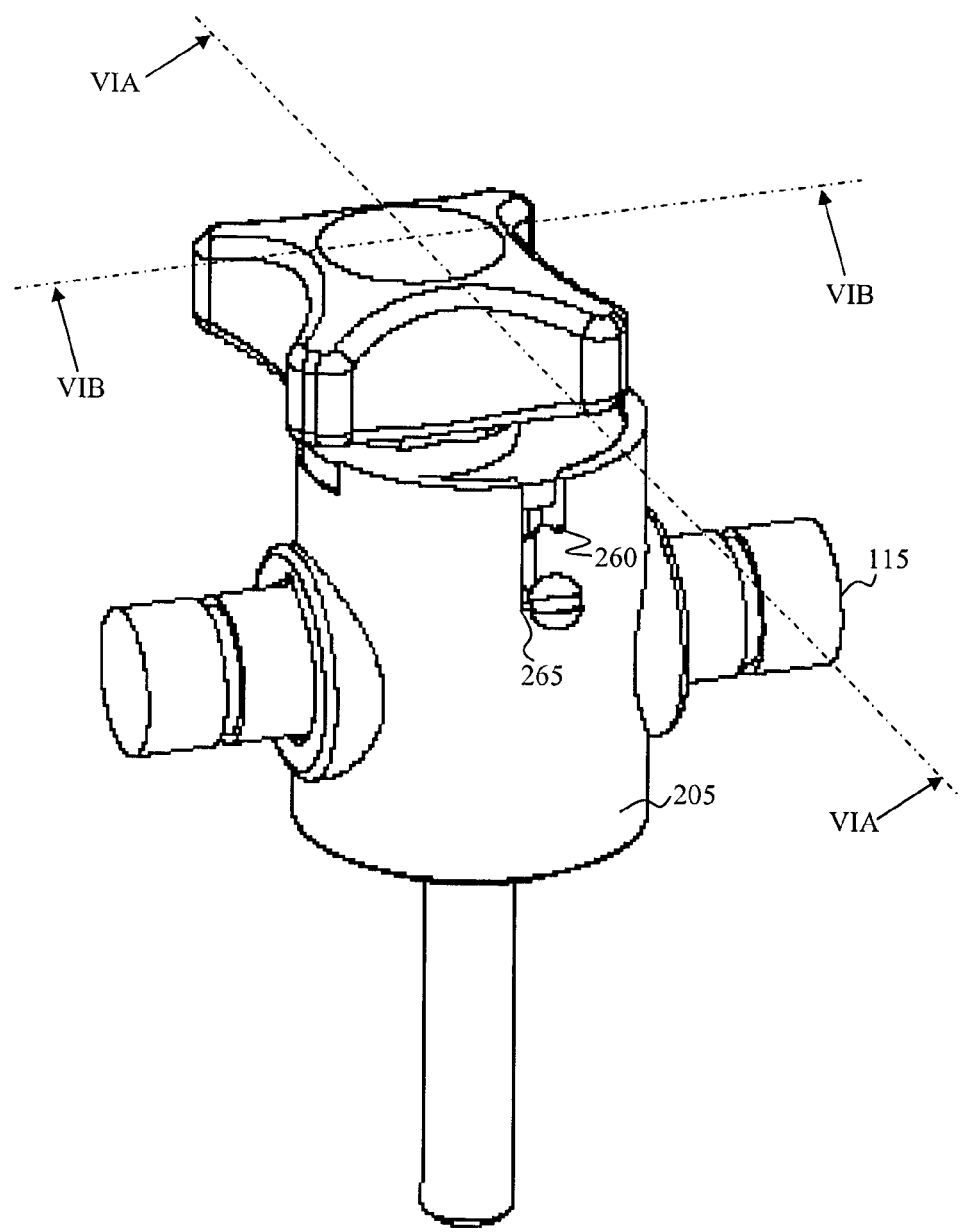
FIG. 5 is an axonometric view of the clamp of FIGS. 2 and 3, in a second working condition.

A clamp 120 according to an embodiment of the present invention is shown in various views in FIGS. 2, 3, 4A, 4B, 5, 6A and 6B; particularly, FIG. 2 is an axonometric exploded view, FIG. 3 is an axonometric view of the clamp in a first working condition; FIGS. 4A and 4B are sectional views along the planes IVA-IVA and, respectively, IVB-IVB; FIG. 5 is an axonometric view of the clamp in a second working condition, and FIGS. 6A and 6B are sectional views along the planes VIA-VIA and, respectively, VIB-VIB.

The clamp 120 includes a clamp body 205 that, in the shown example, has cylindrical shape and is internally hollow, and is provided, in a side wall thereof, of a pair of coaxial holes 210. The clamp body 205 is made of a substantially rigid material, for instance in plastics, preferably in polyamide (preferably loaded with glass fibers to confer a greater resistance to the clamp) or in suitable strengthened polypilene, or in metal, particularly in steel, preferably stainless steel.

The clamp body 205 has, for one portion of its prevailing length, a substantially uniform inner diameter; the inner diameter of the clamp body 205 varies in correspondence of the two longitudinal ends thereof. Particularly, in correspondence of a first end 207$s$, the inner diameter of the clamp body 205 increases, and the difference of diameter creates a first shoulder 209$s$; in correspondence of another end 207$i$, the inner diameter of the clamp body 205 reduces, originating a second shoulder 209$i$. A further reduction of the inner diameter of the clamp body 205 in correspondence of the second end 207$i$ creates a third shoulder 211, in which a generically annular groove 213 is formed.

Each through hole 210 has section of shape and size such as to allow the passage of the bar 115, for instance (as shown) each through hole 210 has a circular section and diameter D corresponding to (slightly greater than) the diameter of the rod that constitutes the bar 115; preferably, each hole 210 has, at its entrance, a flare that facilitates the insertion of the bar 115. Alternatively, the through hole 210 can have square section or generically rectangular section or any other shape may be necessary, conjugated to the shape of the bar that the clamp is intended in operation to support to the frame of the belt conveyor.

The clamp 120 is provided with an eye bolt 215, having an eye 215$o$ and a stem 215$g$ at least partially threaded (at one end thereof distal from the eye 215$o$), adapted to engage by screwing a threaded hole provided for in the lower part of a tightening handle grip 235. The first end 207s of the clamp body can be closed by a fixing plate 240, of shape and size adapted to the abutment against the first shoulder 209s, and in which a through hole 250 is formed for the passage of the stem 215g of the eye bolt 215.

In use, as will be described later, the eye bolt 215 is used to block the bar 115 in a desired position inside the clamp body 205; acting on the tightening handle grip 235 by screwing/unscrewing it, a user can tighten/release the bar 115.

To block the bar 115 in the desired position, the eye bolt 215 cooperates with a flexion spring 220. In detail, the flexion spring 220 is, in the example shown and described, constituted by a bent wire (or by a foil) of suitable material, for instance silica steel or steel with high content of carbon or stainless steel; particularly, the spring 220 includes a hookup ring 220a for hooking to the clamp body 205, adapted to be accommodated in the groove 213 provided in the clamp body 205; from the hookup ring 220a a first wire segment 220b departs, which, in the shown example, is directed substantially orthogonally to a plane in which the hookup ring lies 220a; the first wire segment 220b continues in a second wire segment 220c, directed so as to form an angle that, when the spring is at rest, is approximately 90°; the second wire segment 220c preferably ends with a knob 220d.

Thus is disclosed a clamp 120 for clamping a support bar 115 of a conveyor 100, comprising a clamp body 205 for slidingly accommodating the support bar 115 and positioning means 220 for holding the support bar 115 in a predetermined position with respect to the clamp body 205, further comprising distinct tightening means 215 for blocking the support bar 115 in the predetermined position. The tightening means 215 are separate from the positioning means 220. The positioning means 220 are elastic positioning means to elastically engage the support bar 115. In this embodiment the elastic positioning means are formed by a wire spring. The positioning means 220 are arranged to cooperate with positioning notches 225 on the support bar 115.

In the wall of the clamp body 205 a slot 255 is formed, open toward the first end 207s and adapted to allow the passage of the second wire segment 220c, so that in use the knob 220d projects from the clamp body 205, and can be used by a user for engaging/disengaging the spring 220, as will be described in detail in the following. The slot 255 is shaped in such way to have a first and a second support grooves 260 and 265, spaced apart along the longitudinal axis of the clamp body 205 and each of which is adapted to accommodate, holding it, the second wire segment 220c of the spring 220. Particularly, the first support groove 260 is placed at a first distance D1 from the axis of the through holes 210, while the second support groove 265 is placed at a second distance D2, smaller than the first distance D1, from the axis of the through holes 210. The first support groove 260 has the function of keeping the spring 220 disengaged (FIGS. 3, 4A and 4B), as it will be described in the following, while the second support groove 265 has the function of keeping the spring 220 engaged (FIGS. 5, 6A and 6B).

Along the bar 115, one or more grooves (or positioning notches) 225 are provided, for instance annular in shape, that are adapted to cooperate with the flexion spring 220 to allow a precise and quick longitudinal positioning of the bar 115 relative to the clamp body 205. Particularly, the groove(s) 225 have a width such as to accommodate, at least partially, the second wire segment 220c, thus stopping the bar 115, and accordingly the guide-holding element 110 mounted on the head thereof in the desired position.

For mounting the clamp body 205 to the respective support 135, a screw 270 is used. In use, the screw 270 is inserted into the clamp body 205 from the first end 207s, until its head is brought in abutment against the third shoulder 211, with the stem projecting from the second end 207i of the clamp body 205.

The use of the clamp 120 is very simple, and the assembling operations are very fast.

Particularly, a possible (but not limitative) sequence of operations provides for inserting the spring 220 into the clamp body 205, so that its hookup ring 220a is inserted in the groove 213. The screw 270 is then inserted into the clamp body 205, so that the hookup ring 220a, and accordingly the spring 220, are blocked against the shoulder by the screw head. The clamp is mounted to the respective support 135.

Initially, the spring is not engaged, and the terminal portion of the second wire segment 220c rests on the first support groove 260 (FIGS. 3 and 4A).

Subsequently, the eye bolt 215 is inserted into the clamp body 205, the fixing plate 240 is put in position, and the tightening handle grip 235 is screwed on the stem 235g of the eye bolt. The bar 115 is then inserted, and is caused to horizontally slide through each hole 210 and through the eye 215o. Since the spring 220 is disengaged, the second wire segment 220c is displaced from the axis of the holes 210, and thus it does not interfere with the bar 115 (FIGS. 4A and 4B).

At this point, the spring 220 is engaged: acting on the knob 220d, the user brings the terminal portion of the second wire segment 220c in the second support groove 265 (FIGS. 5 and 6A). In this condition, the second wire segment 220c abuts against the external surface of the bar 115.

By sliding the bar 115 further relative to the clamp body, when one of the grooves 225 reaches the second wire segment 220c, the latter falls into the groove (FIG. 6B), emitting a characteristic sound, that signals the attainment of the position to the user, and holds the bar 115 against the further sliding, thanks to the elastic strength of the spring. In this way, the position reached by the bar is maintained.

The user then checks if the bar 115 is in the desired position. If the position has not been reached yet, the user disengages the spring 220 (acting on the knob 220d to bring the terminal portion of the second thread segment 220c into the first support groove 260): the spring is this displaced from the groove in the bar 115 (FIG. 4B), and the position of the bar 115 is slightly changed (the second wire segment 220c of the spring 220 does not touch the bar 115, allowing the latter to easily slide). The spring is then re-engaged.

Once the desired position is reached, acting on the tightening handle grip 235, the user tightens the eye bolt 215, and thus the bar 115 is tightly blocked to the clamp body, recovering the inevitable plays between the latter and the bar.

In other words, the tight blocking of the bar 115 with respect to the clamp body is entrusted to the eye bolt 215, while the action of the spring 220 is exploited only for the easy and precise positioning of the bar 115. Until the desired position is not reached, the eye bolt 215 is not tightened, so that the user, by repeatedly engaging/disengaging the spring 220, can adjust the position of the bar 115 with extreme ease and reduced effort. This significantly reduces the time needed to assembly the clamp 120, since the tightening of the bar 115 is performed only in the final phase, once the desired position is reached.

Moreover, the tightening of the bar 115, being guaranteed by distinct means compared to those that serve to the positioning of the bar 115, is very effective also in presence of significant transversal stress on the bar; at the same time, since the spring 220 is used only for the positioning of the bar 115, and it is not requested to exert a substantially blocking action (with the exception of the action useful to avoid that, once one of the admissible positions is reached, the bar can be subject to an undesired, further axial slide), it is not necessary to use springs capable of exerting substantial elastic forces. This allows a reduction of the cost of the spring, and accordingly a reduction of the production cost of the clamp 120.

Naturally, several changes and variations could be made to the solution described above by one skilled in the art, for the purpose of satisfying contingent and specific needs. Particularly, although the present invention has been described with a certain level of detail with reference to the preferred embodiments, it is understood that several omissions, substitutions and changes in the embodiments and in the details, as well as other embodiments are possible; it is also expressly understood that specific elements and/or method steps described in connection with any embodiment of the described invention can be included in any other embodiment as a normal design choice.

For example, the number of annular grooves provided in the bar 115 does not constitute a limitation; particularly, only one annular groove could be provided for. Additionally, such grooves can have a different shape than the annular one, for instance they can be shaped as arc of circumference.

The use of eye bolts is to be intended only as a possibility, and not limitatively: in general it is possible to use any mechanical element, distinct from the elastic positioning element, adapted to exert an action of traction or push (for instance, a screw or a headless screw that is arranged so as to be able to act on the bar) on one of the bars to be joined, particularly exerting on the bar a traction transversal thereto.

The possibility is also not excluded of using the solution of the present invention using, in alternative to the tightening handle grip 235, other tightening means like threaded dice; in some cases, the clamping of the bar 115 may require the use of tools, and it can thus result slightly more burdensome compared to the case in which the tightening handle grip is provided 235, however avoiding to use the tightening handle grip allows a reduction of the global cost of the proposed clamp.

Moreover, using the solution of the present invention it is possible to realize cross clamps, adapted to allow the joining of two or more bars, so as to render them integral, with the respective longitudinal axes that form a desired angle, for example 90° or 45°.

For example, by properly combining two clamps in accordance with the solution of the present invention, it is possible to obtain a cross clamp that has the tightening handle grip at every end thereof corresponding to the clamps.

I claim:

1. A clamp for clamping a support bar of a conveyor, comprising a clamp body for slidingly accommodating the support bar and positioning means for holding the support bar in a predetermined position with respect to the clamp body, further comprising distinct tightening means for blocking the support bar in the predetermined position, wherein the positioning means are arranged to cooperate with positioning notches on the support bar.

2. The clamp according to claim 1, wherein the positioning means are elastic positioning means to elastically engage the support bar.

3. The clamp according to claim 1, wherein the positioning means are arranged in such a way as to have a first working position in which the positioning means are elastically urged in abutment against the bar to engage at least one positioning notch provided on the bar upon reaching of a predetermined position, so as to substantially to prevent any further longitudinal slide of the bar once said predetermined position has been reached.

4. The clamp according to claim 3, wherein said positioning means have a second working position in which the positioning means are kept displaced from the bar.

5. The clamp according to claim 3, wherein the positioning means include a wire or plate spring comprising a wire segment that, when the positioning means are in the first working position, is urged towards an axis of said pair of holes.

6. The clamp according to claim 5, wherein said spring includes a knob for a manual driving.

7. The clamp according to claim 6, in which said clamp body includes a slot formed in side walls, and said slot includes a first support groove and a second support groove for said spring, said first and second support groove defining the second and the first working positions of said positioning means.

8. The clamp according to claim 1, wherein said tightening means are adapted to stop the bar with respect to the clamp body against existing plays between the bar and the clamp body.

9. The clamp according to claim 1, in which the clamp body is a hollow body with a pair of coaxial holes, formed in side walls of the hollow body, adapted in use to allow passage of the bar.

10. The clamp according to claim 1, wherein the tightening means include mechanical means actuatable to exert on the bar a traction or a push.

11. The clamp according to claim 10, wherein said tightening means include an eye bolt tension rod adapted to be inserted into the clamp body, said eye bolt tension rod having an eye into which the bar can be inserted.

12. The clamp according to claim 11, wherein said tightening means further include driving means to operate in traction the eye bolt tension rod so as to block the bar.

13. The clamp according to claim 1, wherein the clamp body has a generically cylindrical shape.

14. A clamp adapted to clamp a bar, particularly for support of components of conveyors of articles, the clamp comprising:
a clamp body adapted to accommodate said bar with possibility of adjustment of a position of the bar relative to the clamp by longitudinally sliding the bar with respect to the clamp body;
positioning means arranged in such a way as to have a first working position in which the positioning means are elastically urged in abutment against the bar to engage at least one positioning notch provided on the bar upon reaching a predetermined position, so as to substantially to prevent any further longitudinal slide of the bar once said predetermined position has been reached, further comprising:
tightening means distinct from said positioning means and adapted in use to firmly block the bar in position with respect to the clamp body.

15. The clamp according to claim 14, wherein the positioning means are elastic positioning means to elastically engage the bar.

16. The clamp according to claim 14, wherein the positioning means are arranged to cooperate with positioning notches on the bar.

17. The clamp according to claim 14, wherein said tightening means are adapted to stop the bar with respect to the clamp body against existing plays between the bar and the clamp body.

18. The clamp according to claim 14, wherein said positioning means have a second working position in which the positioning means are kept displaced from the bar.

19. The clamp according to claim 14, in which the clamp body is a hollow body with a pair of coaxial holes, formed in side walls of the hollow body, adapted in use to allow passage of the bar.

20. The clamp according claim 14, wherein the positioning means include a wire or plate spring comprising a wire segment that, when the positioning means are in the first working position, is urged towards an axis of said pair of holes.

21. The clamp according to claim 20, wherein said spring includes a knob for a manual driving.

22. The clamp according to claim 21, in which said clamp body includes a slot formed in side walls, and said slot includes a first support groove and a second support groove for said spring, said first and second support groove defining the second and the first working positions of said positioning means.

23. The clamp according to claim 14, wherein the tightening means include mechanical means actuatable to exert on the bar a traction or a push.

24. The clamp according to claim 23, wherein said tightening means include an eye bolt tension rod adapted to be inserted into the clamp body, said eye bolt tension rod having an eye into which the bar can be inserted.

25. The clamp according to claim 24, wherein said tightening means further include driving means to operate in traction the eye bolt tension rod so as to block the bar.

26. The clamp according to claim 14, wherein the clamp body has a generically cylindrical shape.

* * * * *

UNITED STATES PATENT AND TRADEMARK OFFICE
CERTIFICATE OF CORRECTION

PATENT NO. : 8,015,675 B2  
APPLICATION NO. : 11/971517  
DATED : September 13, 2011  
INVENTOR(S) : Andreoli Page 1 of 1

It is certified that error appears in the above-identified patent and that said Letters Patent is hereby corrected as shown below:

Title page Item (30) Foreign Application Priority Data "MI2007A0031" should be changed to -- MI2007A000031 --

Signed and Sealed this
Sixth Day of December, 2011

David J. Kappos
*Director of the United States Patent and Trademark Office*